United States Patent
Yao

(10) Patent No.: US 6,666,823 B2
(45) Date of Patent: Dec. 23, 2003

(54) BEAM COMBINATION METHOD AND SYSTEM

(75) Inventor: Lin Xin Yao, Bellevue, WA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 0 days.

(21) Appl. No.: 10/106,566

(22) Filed: Mar. 26, 2002

(65) Prior Publication Data

US 2002/0144549 A1 Oct. 10, 2002

Related U.S. Application Data

(60) Provisional application No. 60/281,365, filed on Apr. 4, 2001.

(51) Int. Cl.$^7$ .................................................. A61B 8/00
(52) U.S. Cl. ........................................ 600/443; 600/447
(58) Field of Search ................................ 600/437, 438, 600/440, 441, 442, 443, 447, 459–471; 128/916; 73/625, 626; 367/7, 11, 130, 138

(56) References Cited

U.S. PATENT DOCUMENTS

| | | | | |
|---|---|---|---|---|
| 5,318,033 A | * | 6/1994 | Savord | 600/447 |
| 5,462,057 A | * | 10/1995 | Hunt et al. | 600/447 |
| 5,469,851 A | * | 11/1995 | Lipschutz | 600/447 |
| 5,544,128 A | | 8/1996 | Kim et al. | |
| 5,667,373 A | | 9/1997 | Wright et al. | |
| 5,718,230 A | | 2/1998 | Chapman et al. | |
| 5,720,708 A | * | 2/1998 | Lu et al. | 600/447 |
| 5,793,701 A | | 8/1998 | Wright et al. | |
| 6,016,285 A | | 1/2000 | Wright et al. | |

* cited by examiner

Primary Examiner—Ali M. Imam

(57) ABSTRACT

Methods are described for parallel beamforming with beam combination of formed beams from different transmit beams in an ultrasound imaging system. The methods provide advantages because the combination of receive beams that are produced from different transmit beams enables the production of an ultrasonic image at faster frame rates that does not suffer from the image quality degradation normally associated with parallel beamforming, and does not require process intensive interpolation.

23 Claims, 3 Drawing Sheets

BEAM COMBINATION METHOD AND SYSTEM

RELATED APPLICATION

This application claims the benefit of the filing date pursuant to 35 U.S.C. §119(e) of Provisional Application Serial No. 60/281,365 (Parallel Beamforming With Beam Combination), filed Apr. 4, 2001, the disclosure of which is incorporated herein by reference.

BACKGROUND

The invention relates generally to the field of ultrasonic imaging. More particularly, the invention relates to multiple beam beamforming for ultrasonic imaging.

Multiple beam beamforming techniques, sometimes called parallel beamforming, form two or more receive beams in response to a single transmit beam. For example, one broad beam is transmitted and two or more receive beams are simultaneously formed from responsive echo signals.

Due to the parallel processing of data, image artifacts may be generated. The image artifacts are manifested in geometrical distortion, brightness variation, blockiness and/or degraded lateral resolution. One proposed solution to reduce the presence of these artifacts is provided in U.S. Pat. No. 5,667,373 to Wright et al. Coherent data along a same line is averaged, and data from two different lines are phase adjusted and interpolated coherently to form a synthized line of data. One problem with the Wright solution is the performance of process intensive interpolation to create the synthesized beam.

BRIEF SUMMARY

The present invention is defined by the following claims, and nothing in this section should be taken as a limitation on those claims. By way of introduction, the preferred embodiments described below include methods and systems for forming received ultrasound data. Multiple receive beams are formed in response to each transmit beam. Two or more receive beams responsive to different transmit beams are formed along a same line. The co-linear receive lines are combined to remove artifacts. The combination is responsive to the geometric distortion. For example, the receive lines are weighted as a function of the distance from any receive line to the associated transmit line. In one embodiment, four receive lines are obtained for each transmit line. Two of the four receive lines for one transmission are co-linear with a respective two of the four receive lines of another transmission. Data for each of the co-linear lines is combined. Unequal weights are used for combining each set of co-linear data due to the different distances between each receive line and the associated transmit lines.

A first aspect is a method for forming received ultrasound beams for an ultrasound image. The method comprises transmitting at least two adjacent transmit beams; responsive to the transmitting, forming at least two adjacent receive beams for each of the transmit beams; and combining at least two of the received beams. The combined received beams are disposed at approximately the same location, and at least two of the combined received beams are formed from different transmit beams.

A second aspect is a system for producing output frames in an ultrasound imaging system. The system comprises transducers, a beamformer, digital echo processors, and a scan converter. The transducers are adapted to transmit and receive ultrasound pulses. The beamformer is adapted to simultaneously generate at least four receive beams in response to a transmit beam. Each digital echo processor is adapted to combine data corresponding to at least two receive beams emanating from the same target location. The scan converter includes processing resources adapted to process the combined receive beam data to form an output frame.

In a third aspect, a method for forming received ultrasound data is provided. At least first and second beams are transmitted along first and second different scan lines. At least first and second receive beams are formed in response to the first transmitted beam. At least third and fourth receive beams are formed in response to the second transmit beam. The third receive beam is co-linear with the second receive beam. The second receive beam is combined with the third receive beam in response to unequal weights. A system including a transducer, beamformer and processor for implementing the above method may also be provided.

In a fourth aspect, another method for forming received ultrasound data is provided. Acoustic energy is transmitted along first and second lines. The first line is spatially different than the second line. A first set of data representing at least four receive lines is formed in response to the transmission along the first line, and a second set of data representing at least four receive lines is formed in response to the transmission along the second line. At least first and second receive lines of the first set are co-linear with third and fourth receive lines, respectively, of the second set. Data of the first receive line is combined with data of the third receive line, and data of the second receive line is combined with data of the fourth receive line. A system including a transducer, beamformer and processor for implementing the above method may also be provided.

In a fifth aspect, yet another method for forming received ultrasound data is provided. Acoustic energy is transmitted along first and second transmit lines. The first transmit line is spatially different than the second transmit line. A first set of data representing at least two receive lines is formed in response to the transmission along the first transmit line. A second set of data representing at least two receive lines is formed in response to the transmission along the second transmit line. At least a first receive line of the first set is co-linear with a second receive line of the second set. Data of the first receive line is combined with data of the second receive line in response to first and second weights. The first weight is a function of a distance of the first receive line from the first transmit line, and the second weight is a function of a distance of the second receive line from the second transmit line. A system including a transducer, beamformer and processor for implementing the above method may also be provided.

Further aspects and advantages of the invention are discussed below in conjunction with the preferred embodiments.

BRIEF DESCRIPTION OF SEVERAL VIEWS OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

At least two receive beams are formed from each of at least two separate transmit beams. In one embodiment, two co-linear or overlapping receive beams responsive to different transmit beams are combined. In another embodiment, two sets of two or more co-linear receive beams responsive to different transmit beams are combined. The combination accounts for the center shift associated with the distance between a receive beam and the associated transmit beam. Geometrical distortion occurs, in part, because the limited width of the transmit beam profile causes the receive beam centers to shift towards the respective transmit beam, geometrically distorting the formed beam.

By combining or blending data for co-linear receive beams, beamforming is accomplished with no interpolation between formed beams to form synthetic beams. Some interpolation of synthetic lines may be provided. The received beams can be formed in a consistent symmetrical manner in the lateral direction, reducing geometrical distortion and other image artifacts. The blending of overlapping receive beams smoothes or filters the transition from one receive line to another in a resulting image.

Figure 1:
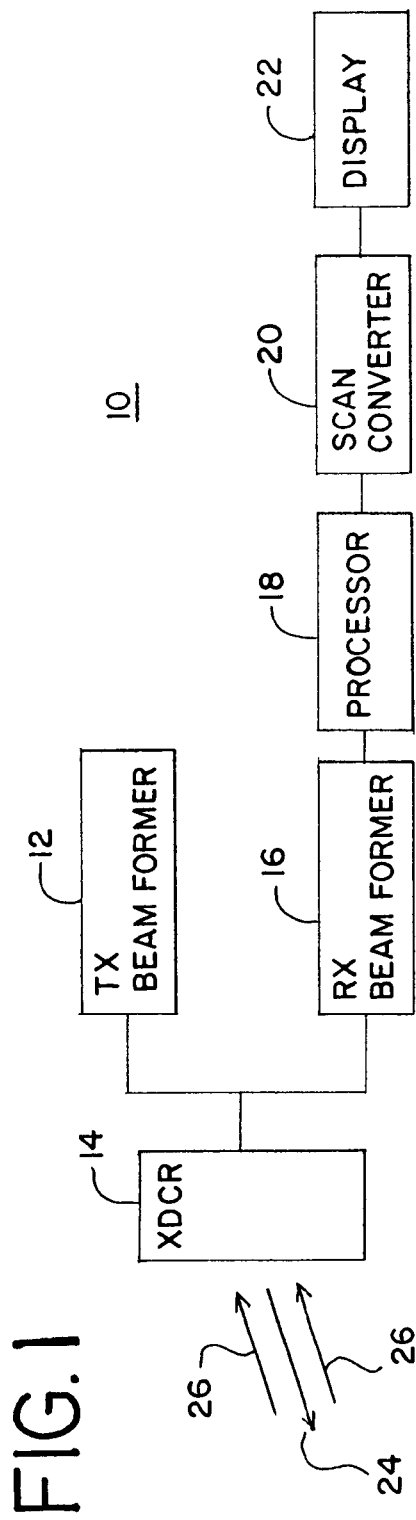
FIG. 1 is a block diagram of an ultrasound system of one embodiment for forming received ultrasound data.

FIG. 1 shows a block diagram of an ultrasound system 10 for forming received ultrasound data. The ultrasound system 10 includes a transmit beamformer 12, a transducer 14, a receive beamformer 16, a processor 18, a scan converter 20 and a display 22. Additional, different or fewer components may be provided. In various embodiments, the ultrasound system 10 is one of an Antares or other system manufactured by Siemens Medical Systems, a Sequoia® or other system manufactured by Acuson, a Siemens Company, or an other ultrasound system manufactured by these or other companies.

The transmit beamformer 12, in part, operates as a conventional transmit beamformer to generate a set of transmit signals for the individual transducer elements included in the transducer 14. For example, the transmit beamformer 12 forms one or more a suitably shaped ultrasonic pulses for the various elements of the transducer 14. The pulses are delayed relative to each other for steering by any suitable combination of delays, phase shifts and phase rotations. The focus delays are selected to cause ultrasonic signals from the transducer 14 to constructively interfere at a selected transmit focus along a selected transmit line 24.

In one embodiment, the transmit beamformer 12 uses delays and apodization to form transmit beams with a wide beamwidth. For example, a beamwidth with a −6 dB roll-off at spatial locations beyond a greatest distance from a center of the transmit beam to any receive beams formed in response to the transmit beam is used. Other beamwidths may be used. For example, the transmit beamwidth may be more narrow where the combination of receive beams is associated with beams different distances from the center of the transmit beam. The combination reduces or removes the amplitude difference associated with each receive beam due to the transmit beamwidth.

The transducer 14 comprises a linear transducer array, a curved array, a phased array, a single element, a one-dimensional array, a 1.5 dimensional array or a two-dimensional array of elements. In response to the transmit pulses from the transmit beamformer 12, the transducer 14 transmits a beam of ultrasound energy along a scan line 24. These ultrasound transmit beams are sequentially scanned across a field of view, such as scanning in a linear, Vector®, sector or other format. The transmit beams are sequentially transmitted along spatially different scan lines 24, such as parallel or adjacent scan lines 24 within the field of view of the transducer 14.

The receive beamformer 16 comprises a digital or analog beamformer for applying delays, apodization amplification and summing for forming receive beams responsive to each of the transmit beams. In one embodiment, the receive beamformer 16 is one of the receive beamformers disclosed in U.S. Pat. Nos. 5,544,128; 5,667,373; 5,718,230; 5,793,701 and 6,016,285, the disclosures of which are incorporated herein by reference. For example, the receive beamformer 16 includes separate channels for forming two or more receive beams from echo signals in response to one transmit beam. Separate delays and/or apodization are applied in each channel. As another example, echo signals from the transducer 14 are applied to both a single channel for common processing and then to separate channels for forming the two or more different receive beams. As yet another example, the echo signals responsive to one transmit beam are stored, and the two or more receive beams are formed sequentially. In another example, separate receive beamformers are provided for each receive beam or sub-sets of all of the receive beams formed in response to one transmit beam.

The receive beamformer 16 forms the receive beams along two or more receive lines 26. The receive lines 26 are spatially distinct from each other. The receive lines 26 are also spatially distinct from the transmit line 24, but one of the receive lines 26 may be co-linear or along the same line as the transmit line 24. In one embodiment, receive beams are formed along one, two or more receive lines 26 on each side of the transmit line 24 for the corresponding transmit beam. The receive lines 26 are symmetrical or asymmetrical in position relative to the transmit line 24.

The processor 18 comprises one or more of an application specific integrated circuit, a general processor, a digital signal processor, other processors now known or later developed, analog circuits, digital circuits or combinations thereof. In one embodiment, the processor 18 is part of a detector, such as a B-mode, Doppler or flow detector. In other embodiments, part or all of the processor 18 comprises one or more processors dedicated to combining data representing receive beams, processors used for scan conversion, processors in the receive beamformer 16, control processors or other processors. The processor 18 combines data representing co-linear receive beams prior to detection (coherent data) or after detection. For coherent data (e.g. in-phase and quadrature data or radio frequency data), the combination is of magnitude information with or without phase alignment. In alternative embodiments, the processor 18 is positioned to combine scan converted data or data elsewhere between the receive beamformer 16 and the display 22.

The scan converter 20 comprises one or more analog or digital devices for formatting ultrasound data representing the field of view into a format for the display 22. The display 22 generates an image based on the combined, scan converted data. A B-mode, Doppler or flow mode, combination B-mode and Doppler or flow mode or other image is displayed.

Figure 2:
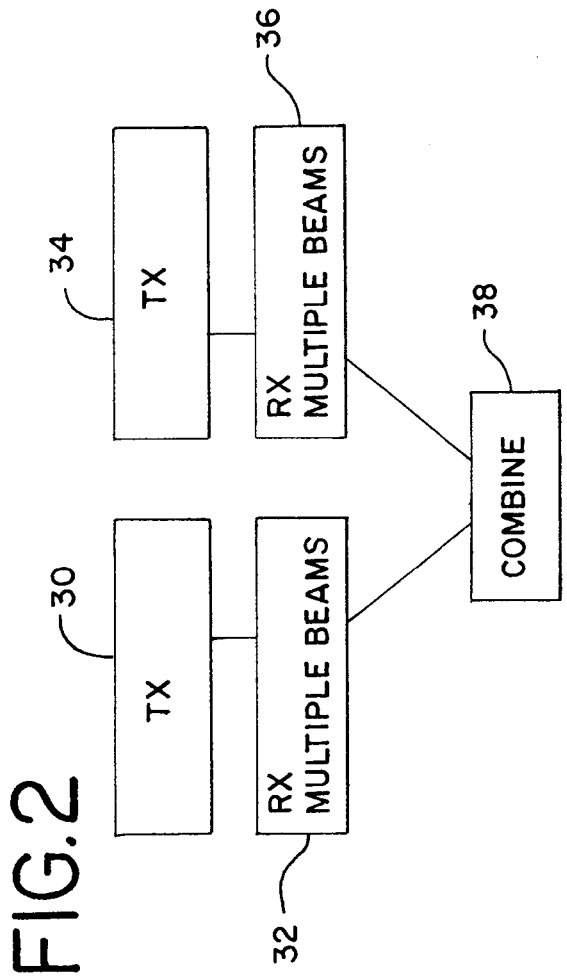
FIG. 2 is a flow chart diagram of one embodiment for forming received ultrasound data.

FIG. 2 shows a method of one embodiment of the operation of the system of FIG. 1. Two different transmit beams are transmitted in acts 30 and 34. In acts 32 and 36, multiple receive beams are formed in response to each of the acts 30 and 34, respectively. In act 38, the data for co-linear receive beams responsive to the different transmit beams is combined.

The transmit acts 30 and 34 are performed sequentially, but may be temporally separated by other transmissions of ultrasound energy. The transmit beams are transmitted along spatially different lines 24 (FIG. 1). The different lines 24 are adjacent or substantially parallel lines within the scan pattern, but may be spatially separated by transmission along one or more intervening lines 24. In alternative embodiments, the spatially different lines 24 overlap or intersect within the field of view.

In response to the transmit act 30, two or more receive beams are formed in act 32. For example, two, three, four or more spatially different adjacent receive beams are formed representing lines 26 near the transmit line 24. The receive beams are each spatially different. One or none of the receive beams may be co-linear with the transmit beam (i.e. one receive line 26 is along the transmit line 24). Any of various spatial distributions of the receive beams may be used, such as equally spaced, substantially parallel receive beams positioned symmetrically about the transmit line 24 or center of the transmit beam. In other embodiments, unequal spacing of the receive beams, non-parallel receive beams, and/or unsymmetrical placement about the transmit line 24 is provided.

In response to the subsequent transmit act 34, two or more receive beams are formed in act 36. These subsequent receive beams of act 36 are formed in a similar manner as discussed above for act 32. As a result, two sets of data each representing a plurality of receive beams responsive to a single transmit beam are provided. A receive beam responsive to one transmitted beam may be co-linear with a different transmitted beam. In one embodiment, the transmit lines 24 are spaced such that the receive lines 26 for any given transmit line 24 are between transmit lines 24 adjacent to that given transmit line 24. Other spacing with wider or narrower distribution of receive beams relative to transmit beams may be used.

One or more receive beams responsive to different transmit beams are co-linear. Receive beams are considered co-linear if both receive beams represent substantially the same receive line 26. Receive beams associated with different beam widths, different beam patterns due to different foci or focal patterns, different aberrations, or slightly divergent are also co-linear. A portion of an arcing or other non-linear receive beam may be co-linear with another different receive beam.

In one embodiment with two receive beams for each transmit beam, one receive beam of one set is co-linear with one receive beam of another set. In an embodiment with three receive beams for each transmit beam, one or two receive beams of one set are co-linear with one or two receive beams of another set. In an embodiment with four receive beams for each transmit beam, one, two or three receive beams are co-linear with one, two or three receive beams of another set.

For scanning a field of view, additional sets of data representing multiple receive beams are formed in response to additional sequential transmissions. The additional sequential transmissions are along spatially different transmit lines 24, such as a transmission along a transmit line 24 adjacent to a most recently transmitted beam. One or more of the receive beams are co-linear with one or more receive beams responsive to a different transmit beam. In one embodiment, two, three or more receive beams responsive to two, three or more transmit beams are co-linear. All of the receive beams are co-linear with another receive beam in one embodiment, but one or more of the receive beams may not be co-linear with another receive beam.

In act 38, the co-linear receive beams are combined. In one embodiment, a weighted combination is used. The receive beams along a receive line are weighted relative to other receive beams along the same receive line. The weights are equal (i.e. an average) or unequal, such as applying one weight to one receive beam and applying a different weight to a different, co-linear receive beam. In one embodiment, the weights provide a unity gain, such as the weights for the receive beams adding to one. Non-unity gain may be provided. The weight is a same for an entire depth of the receive beam or varies as a function of depth. The data representing the receive beam is multiplied or divided by the weight. The weighted data for the co-linear receive beams is summed or otherwise combined. Unit gain may be provided by normalizing the combined data.

In one embodiment, the weights are selected as a function of the distance from the receive beam or line 26 to the associated transmit beam or line 24. Where the distance is the same for each co-linear receive beam, the weights are equal. Where the distance is different, unequal weights are provided. For example, data for a receive beam spaced closer to the receive beam's corresponding transmit line (i.e. a shorter distance) is weighted more heavily (i.e. a greater weight is applied) than data for another co-linear receive beam spaced further from this other receive beam's corresponding transmit line. In one embodiment using symmetrically spaced receive beams, the weights are linear blending coefficients. The weights are $1/(N+1), 2/(N+1), \ldots N/(N+1)$ where N is the number of receive beams in the receive beam set responsive to one transmit beam that are co-linear with receive beams of the receive beam set responsive to an adjacent transmit beam. For the embodiment shown in FIG. 3, N is 2 and the weights are $1/3$ and $2/3$. The distance indicates an amount of center shift associated with a receive beam. Other indications of the amount of center shift may be used for adaptively selecting the weights. The weighting acts to move the receive beam position, reducing artifacts.

The weighting and combination discussed above is repeated for multiple co-linear receive beams throughout the field of view. The combined data is used for calculations or to form an image for display. The combined data includes reduced artifacts from parallel receive beamforming. By using overlapping or co-linear receive beams, the frame rate is reduced from a frame rate provided by no overlapping receive beams. However, by provided a sufficient number of receive beams in response to each transmit beam, a high frame rate with reduced artifacts is maintained.

Figure 3:
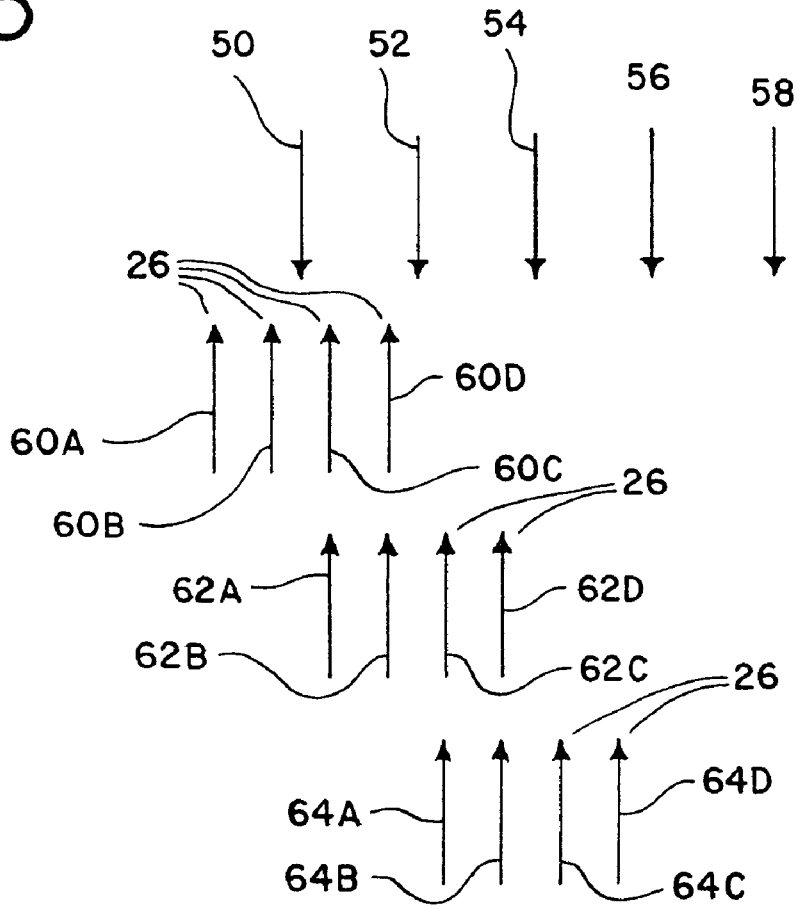
FIG. 3 is a graphical representation of one embodiment for forming received ultrasound data.

FIG. 3 shows a graphical representation of one embodiment for providing a high frame rate with reduced parallel beamforming artifacts. Four receive beams 60A–D, 62A–D, 64A–D are formed for each transmit beam 50, 52, 54. Each set of four receive beams 60A–D, 62A–D, 64A–D are spaced evenly and symmetrically around the corresponding transmit beam 50, 52, 54, respectively. The receive beams 60C–D, 62A–D, 64A–D are co-linear with receive beams of adjacent transmit beams 50, 52, 54, 56, such as two receive beams 60C and 60D on one side of a corresponding transmit beam 50 being co-linear with a respective two receive beams 62A and 62B on one side of a different corresponding transmit beam 52. All of the receive beams 60C–D, 62A–D, 64A–D are co-linear with another receive beam 60C–D, 62A–D, 64A–D except at the edges of a scan pattern (i.e. 60A and 60B). Other combinations of co-linear scanning with all or only a sub-set of all of the receive beams having a co-linear receive beam may be provided.

Receive beam 60C formed in response to transmit beam 60 tends to shift to the left towards the transmit beam 60, while receive beam 62A formed in response to the transmit beam 62 tends to shift to the right towards the transmit beam 62. The amount of shift depends on the distance between the receive beam and the corresponding transmit beam. For example, a greater amount of shift is associated with the receive beams 62A or 60D than the shift associated with receive beams 60C or 62B. Receive beams 62A and 60D are more than twice are far from the transmit beams 52 and 50, respectively, than the receive beams 62B and 60C, also respectively.

Geometric distortion reduction is accomplished by combining receive beam 60C and 62A because the left shift of receive beam 60C is canceled or reduced by the right shift of the receive beam 62A. Because the shifts can differ in magnitude, a simple average may reduce, but not eliminate, the artifact. Reduction may be sufficient.

Similarly, brightness variations can be ameliorated by combination of the received beams 60C–D, 62A–D, 64A–D. For example, receive beams 60B and 60C closer to the corresponding transmit beam 50 may be brighter than receive beams 60A and 60D further from the corresponding transmit beam 50. This brightness variation may be reduced or eliminated by combining brighter received beams (e.g. receive beam 60C responsive to the corresponding transmit beam 50) with dimmer receive beams (e.g. 62A responsive to the corresponding transmit beam 62).

Artifacts caused by beam-to-beam similarity for receive beams formed in response to the same transmit beam are reduced by combining receive beams responsive to different transmit beams. The beam-to-beam similarity is manifested in both thermal noise components and acoustic speckle patterns. In an image in which alternating pairs of receive beams are provided due to use of synthetic lines with actual lines (see FIG. 1A and col. 11, lines 10–45 of U.S. Pat. No. 5,667,373), a pattern of more similar—less similar—more similar—less similar, etc. is provided. The image may appear blocky and have degraded lateral resolution. The difference between receive beams or combined received beams is reduced by combining the receive beams as shown in FIG. 3.

One or more of the artifacts discussed above may be further reduced by selection of weights applied to data representing co-linear receive beams. For example, the co-linear receive beams 60C and 62A are combined in a weighted sum to reduce the center shift artifact described above. Because the center shift artifact becomes more pronounced for receive beams disposed farther from their corresponding transmit beam (e.g. receive beam 62A from transmit beam 52), the receive beams disposed closer to the corresponding transmit beam (e.g. receive beam 60C from transmit beam 50) is altered by a higher or greater weight. In the example of FIG. 3, the receive beam 60C is weighed at K%, where K is higher than 50% (e.g., approximately 70% or a weight of 0.70 or 0.667) and the receive beam 62A is weighed at the lower (1−K)% (e.g., approximately 30% or a weight of 0.30 or 0.333). Similarly, receive beam 60D has a lower weight than receive beam 62B.

This weighting process continues for other co-linear combinations of receive beams. Receive beam 62C, weighed at K%, is then combined with receive beam 64A, weighed at (1−K)%, while receive beam 64B, weighed at K%, is combined with receive beam 62D, weighed at (1−K)%. After the co-linear receive beams are combined, a resulting output frame of data represents the field of view with reduced or eliminate parallel beamforming artifacts.

The receive beams 60A–D, 62A–D and 64A–D are distributed along receive lines 26 across the field of view as represented by the beam index numbers 0–7. According to one embodiment, a transmit beam (e.g., first transmit beam 50) is centered between two receive beams (e.g., 60B and 60C). Four receive beams (e.g., 60A–D) are formed simultaneously in response to the transmit beam 50. Receive beams 60A and 60B may be output to the scan converter 20 or other processing device, while the receive beams 60C and 60D are stored in a memory for further processing or combining with subsequent receive beams (e.g. 62A and 62B). The second transmit beam 52 is disposed adjacent to the first transmit beam 50, and is centered between the receive beams 52B and 52C. Four receive beams (e.g., 62A–D) are formed in response to the second transmit beam 50. The received beams 62A–D or a sub-set of the receive beams (e.g. 62C and 62C) are stored in memory for subsequent combination.

In one embodiment, four digital echo processors (DEP) or combination channels combine data representing co-linear receive beams. Each digital echo processor combines the data for every fourth receive line 26 or beam index number. As the sequentially acquired data representing co-linear receive beams is available, the processors combine the data. The data pipeline disposed after each digital echo processor outputs combined data representing a receive line 26. In alternative embodiments, one or other number of digital echo processors or other processors combine the data. The resulting output data represents beams corresponding to the beam index or receive lines shifted as a function of the weighted combination.

To achieve a two-to-one frame rate improvement as compared to conventional reception of one receive beam for each transmit beam, four receive beams are formed simultaneously by the receive beamformer 16 (FIG. 1). The frame rate can be improved even further. For example, a four-to-one frame rate improvement is obtained for using a receive beamformer 16 having bandwidth sufficient to form eight receive beams in response to one transmit beam. As another example, only the two receive beams spaced furthest from the center of the transmit beam are co-linear with the outermost receive beams responsive to an adjacent transmit beam. The outermost receive beams are co-linear and combined, but the inner most of the four receive beams are used without co-linear combination.

Figure 4:
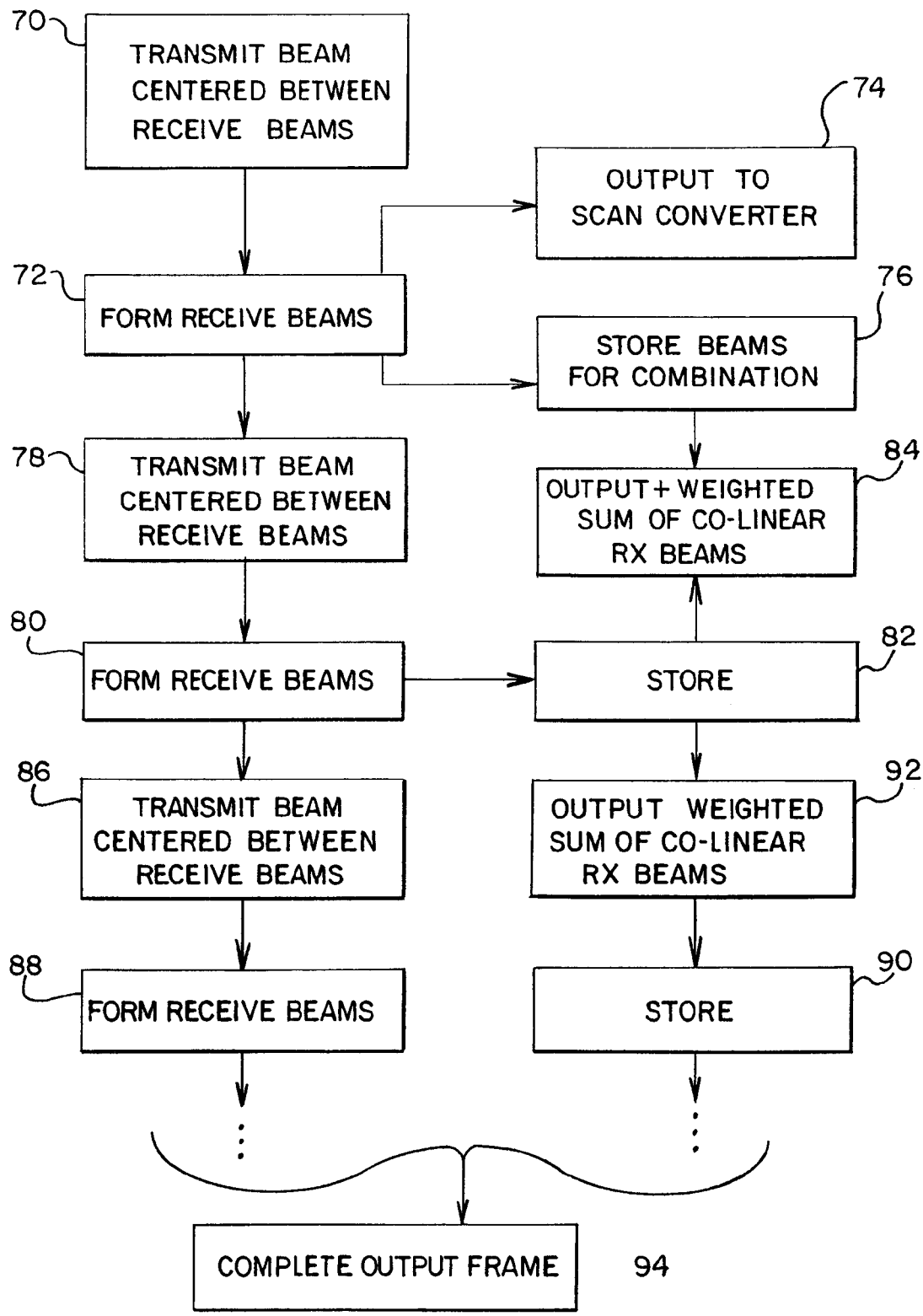
FIG. 4 is a flow chart diagram of another embodiment for forming received ultrasound data.

FIG. 4 shows one method for forming the receive ultrasound data as graphically represented by FIG. 3. A first transmit beam is transmitted from a transducer and is centered between two or more receive beams in act 70. In response to the first transmit beam, a beamformer forms four receives beams 10 in act 72. In act 74, the beamformer provides data corresponding to two received beams at an edge of the field of view without combination to corresponding digital echo processors. The digital echo processors output the data for these two receive beams to the scan converter. Alternatively, these two receive beams are discarded since parallel beamforming artifacts may not be reduced or eliminated in the first and last two receive beams of the scan format (i.e. receive beams at the edge of the field of view). The digital echo processor also stores data of the other receive beams for subsequent combination in a local memory in act 76.

A second beam is transmitted in act 78, where the second transmit beam is centered between two receive beams. In responsive to the second transmit beam, a beamformer forms four receive beams in act 80 and stores the receive beams for subsequent and/or passes the receive beams for current combination in act 82. The digital echo processors then generate data representing two adjacent receive lines as two weighted sums of co-linear receive beams responsive to the first and second transmit beams in act 84. The combined data is output to the scan converter.

The method then continues by transmitting a third beam centered between two receive beams in act 86. In response to the third transmit beam, the beamformer forms four receive beams in act 88 and stores the receive beams for subsequent and/or passes the receive beams for current combination in act 90. The digital echo processors then generate data representing two adjacent receive lines as two weighted sums of co-linear receive beams responsive to the first and second transmit beams in act 92. The combined data is output to the scan converter. The process continues by transmitting additional beams centered between receive beams and processing the receive beams in a similar fashion, i.e., outputting two receive beams to the scan converter after each transmit, until the frame of data representing the field of view for an ultrasound image is complete in act 94.

While the invention has been described above by reference to various embodiments, it should be understood that many changes and modifications can be made without departing from the scope of the invention. For example, five or more receive beams are generated for each transmit beam. Different numbers of receive beams may be formed as a function of the transmit beam, such as forming three receive beams for a first transmit beam and four receive beams in response to a second transmit beam. A variety of received beam and transmitted beam sequences or combinations may be used. Different scan formats may also be used.

It is therefore intended that the foregoing detailed description be understood as an illustration of the presently preferred embodiment of the invention, and not as a definition of the invention. It is only the following claims, including all equivalents, that are intended to define the scope of this invention.

What is claimed is:

1. A method for forming received ultrasound data, the method comprising the acts of:
   (a) transmitting at least first and second beams along first and second different scan lines;
   (b) forming at least first and second receive beams in response to the first beam of (a);
   (c) forming at least third and fourth receive beams in response to the second beam of (a), the third receive beam co-linear with the second receive beam; and
   (d) combining the second receive beam with the third receive beam in response to unequal weights.

2. The method of claim 1 wherein (b) comprises forming a first set of four receive beams in response to the first beam of (a) and (c) comprising forming a second set of four receive beams in response to the second beam of (a), at least two receive beams of the first set co-linear with at least two receive beams of the second set.

3. The method of claim 2 further comprising:
   (e) selecting a second beam weight as a function of a first distance of the second receive beam from the transmitted first beam, the second receive beam adjacent the transmitted beam; and
   (f) selecting a third beam weight as a function of a second distance of the third receive beam from the transmitted second beam, the third receive beam being spaced from the transmitted second beam by at least one receive beam adjacent the transmitted second beam.

4. The method of claim 1 further comprising:
   (e) transmitting a third beam along a third scan line, the third scan line adjacent to the second scan line and different than the first scan line;
   (f) forming at least fifth and sixth receive beams in response to the third beam of (e), the fifth receive beam co-linear with the fourth receive beam; and
   (g) combining the fifth receive beam with the fourth receive beam.

5. The method of claim 1 further comprising:
   (e) selecting a second beam weight as a function of a first distance of the second receive beam from the transmitted first beam; and
   (f) selecting a third beam weight as a function of a second distance of the third receive beam from the transmitted second beam;
   wherein the first distance is different than the second distance.

6. The method of claim 1 wherein (d) comprises combining coherent data prior to detection.

7. The method of claim 1 wherein (d) comprises combining detected data.

8. The method of claim 1 wherein (d) comprises combining in response to weights that are function of a center shift associated with the respective receive beam.

9. An ultrasound system for forming received ultrasound data, the system comprising:
   a transducer for transmitting at least first and second beams along first and second different scan lines;
   a beamformer for forming at least first and second receive beams in response to the first beam and forming at least third and fourth receive beams in response to the second beam, the third receive beam co-linear with the second receive beam; and
   a processor for combining the second receive beam with the third receive beam in response to unequal weights.

10. The system of claim 9 wherein the beamformer is operable to form a first set of four receive beams in response to the first beam and form a second set of four receive beams in response to the second beam, at least two receive beams of the first set co-linear with at least two receive beams of the second set.

11. The system of claim 10 wherein the processor is operable to select a second beam weight as a function of a first distance of the second receive beam from the transmitted first beam, the second receive beam adjacent the transmitted beam, and select a third beam weight as a function of a second distance of the third receive beam from the transmitted second beam, the third receive beam being spaced from the transmitted second beam by at least one receive beam adjacent the transmitted second beam.

12. The system of claim 9 wherein the processor is operable to select a second beam weight as a function of a first distance of the second receive beam from the transmitted first beam, and select a third beam weight as a function of a second distance of the third receive beam from the transmitted second beam;
   wherein the first distance is different than the second distance.

13. The system of claim 9 wherein the processor is operable to combine coherent data prior to detection.

14. The system of claim 9 wherein the processor is operable to combine detected data.

15. The system of claim 9 wherein the processor is operable to combine in response to weights that are function of a center shift associated with the respective receive beam.

16. A method for forming received ultrasound data, the method comprising the acts of:
(a) transmitting along first and second scan lines, the first scan line spatially different than the second scan line;
(b) forming a first set of data representing at least four receive lines in response to the transmission along the first scan line;
(c) forming a second set of data representing at least four receive lines in response to the transmission along the second scan line, at least first and second receive lines of the first set co-linear with third and fourth receive lines, respectively, of the second set; and
(d) combining data of the first receive line with data of the third receive line and second receive line with data of the fourth receive line.

17. The method of claim 16 wherein the first and second receive lines are between the first and second lines, and further comprising:
(e) transmitting along a third scan line, the third line spatially separated from the first scan line by the second scan line;
(f) forming a third set of data representing at least four receive lines, at least two receive lines of the third set of data co-linear with fifth and sixth receive lines from the second set, the first and sixth receive lines on an opposite side of the second line than the third and fourth receive lines.

18. The method of claim 16 further comprising:
(e) weighting the first receive line with a first weight, the second receive line with a second weight, the third receive line with a third weight and the fourth receive line with a fourth weight, the first, second, third and fourth weights a function of a distance from the respective receive line to the associated transmit line of (a), the first weight unequal to the third weight and the second weight unequal to the fourth weight.

19. The method of claim 16 wherein (d) comprises combining in response to weights that are function of a center shift associated with the respective receive beam.

20. An ultrasound system for forming received ultrasound data, the system comprising:
a transducer for transmitting along first and second scan lines, the first scan line spatially different than the second scan line;
a beamformer for forming a first set of data representing at least four receive lines in response to the transmission along the first scan line, and for forming a second set of data representing at least four receive lines in response to the transmission along the second scan line, at least first and second receive lines of the first set co-linear with third and fourth receive lines, respectively, of the second set; and
a processor for combining data of the first receive line with data of the third receive line and second receive line with data of the fourth receive line.

21. The system of claim 20 wherein the first and second receive lines are between the first and second scan lines, the transducer is operable to transmit along a third scan line, the third scan line spatially separated from the first scan line by the second scan line, the beamformer is operable to form a third set of data representing at least four receive lines, at least two receive lines of the third set of data co-linear with fifth and sixth receive lines from the second set, the first and sixth receive lines on an opposite side of the second line than the third and fourth receive lines.

22. The system of claim 20 wherein the processor is operable to weight the first receive line with a first weight, the second receive line with a second weight, the third receive line with a third weight and the fourth receive line with a fourth weight, the first, second, third and fourth weights a function of a distance from the respective receive line to the associated transmit line of (a), the first weight unequal to the third weight and the second weight unequal to the fourth weight.

23. A method for forming received ultrasound data, the method comprising the acts of:
(a) transmitting along first and second transmit lines, the first transmit line spatially different than the second transmit line;
(b) forming a first set of data representing at least two receive lines in response to the transmission along the first transmit line;
(c) forming a second set of data representing at least two receive lines in response to the transmission along the second transmit line, at least a first receive line of the first set co-linear with second receive line of the second set; and
(d) combining data of the first receive line with data of the second receive line in response to first and second weights, the first weight a function of a distance of the first receive line from the first transmit line and the second weight a function of a distance of the second receive line from the second transmit line.

* * * * *